C. E. DAVIS.
CORN-CRIB.

No. 187,750.          Patented Feb. 27, 1877.

Witnesses          Inventor:
A. M. Bryson      Charles E. Davis
H. Frantz

UNITED STATES PATENT OFFICE.

CHARLES E. DAVIS, OF ACKLEY, IOWA.

IMPROVEMENT IN CORN-CRIBS.

Specification forming part of Letters Patent No. 187,750, dated February 27, 1877; application filed May 4, 1876.

*To all whom it may concern:*

Be it known that I, C. E. DAVIS, of Ackley, Hardin county, State of Iowa, have invented a new and useful Self-Feeding Attachment for Corn-Cribs and other Feeder-Pens, which invention is fully set forth in the following specification, reference being had to the accompanying drawings, in which—

Figure 1:
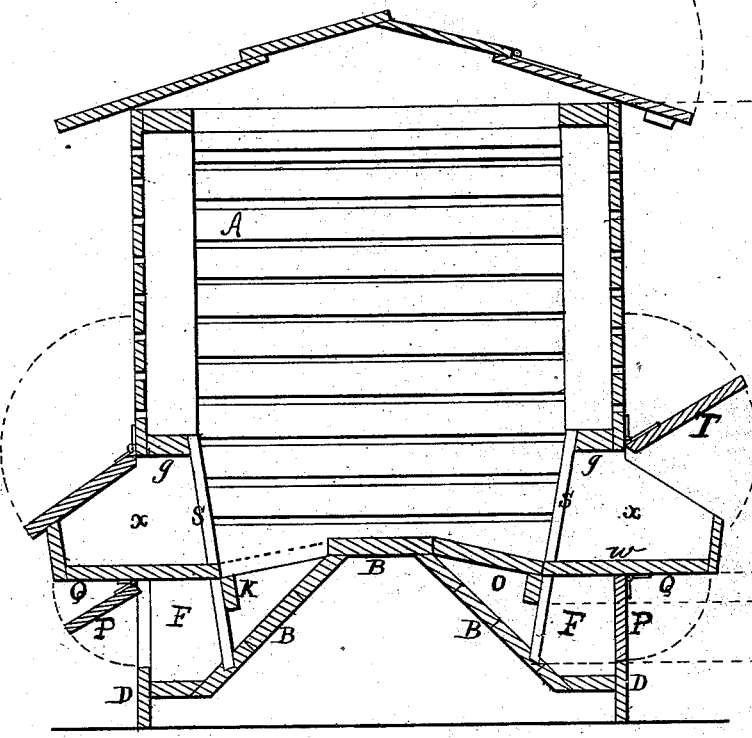
Figure 2:
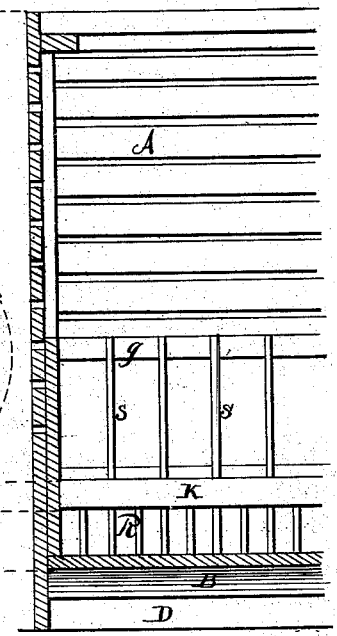

Figure 1 is a vertical cross-section and Fig. 2 is a partial longitudinal section.

The object of my invention is to provide a corn-crib whereby cattle and hogs, or either of them, may be fed from separate troughs or boxes attached thereto and separated from the quantity of corn or other feeding material within the crib by slots, through which the corn or feed passes automatically and supplies the troughs or boxes with corn or other feed as said troughs or boxes become emptied by the animals feeding, dispensing thereby with the labor and necessity of employing a person to continually watch and feed the animals, as has been the common practice heretofore.

In carrying out my invention, the main body of the crib A is constructed in the ordinary manner, with suitable frame-work and slatted sides and roof. The floor or bottom B of the crib is constructed in the form of an inverted trough or pyramid in cross-section, to facilitate the flow of the grain or feed to either side of the crib. Near the bottom and upon either side of the crib is a suitably-constructed box or trough, F, extending the whole length thereof, and separated from the main body of the crib by slats R, through which the grain passes to supply the trough. This trough or box is closed in from the outside by an upwardly and outwardly swinging door, P, suspended from the bottom piece Q of the upper and larger trough or box $x\ x$. This trough or box extends the entire length of the crib, and is similar in its construction to the lower or hog trough F, first described, and is separated from the main crib by slats $s\ s$, which are farther apart than those separating the hog-trough. This trough is also provided with a cover, T, which may be closed down when desired to keep the crib closed and the animals away. The trough $x$ projects out from the walls of the crib, and beyond the lower or hog trough F, so that the walls of the structure will not interfere with the heads of the animals while feeding.

When desirable to shut off the flow of grain to the lower or hog trough on either side or on both sides, a loose cover, O, is provided, which closes down upon the bracket K, and secures the entrance thereto.

Having thus fully described my invention, what I claim as new, and desire to secure by Letters Patent, is—

1. A self-feeding corn-crib, provided with feed troughs or boxes $x$ and F, situated one above the other, substantially as described.

2. A corn-crib provided with a pyramidal floor, B, in combination with troughs F $x$ and cover O, substantially as set forth.

CHARLES E. DAVIS.

Witnesses:
A. M. BRYSON,
H. FRANTZ.